L. D. BROWN.
VEHICLE WHEEL.
APPLICATION FILED MAY 10, 1919.

1,378,399.  Patented May 17, 1921.

Inventor
Lyman D. Brown
By Ithiel J. Cilley
Attorney

UNITED STATES PATENT OFFICE.

LYMAN D. BROWN, OF FLINT, MICHIGAN.

VEHICLE-WHEEL.

1,378,399.  Specification of Letters Patent.  Patented May 17, 1921.

Application filed May 10, 1919. Serial No. 296,256.

*To all whom it may concern:*

Be it known that I, LYMAN D. BROWN, a citizen of the United States, residing at Flint, in the county of Genesee and State of Michigan, have invented certain new and useful Improvements in Vehicle-Wheels, of which the following is a specification.

My invention relates to improvements in wheels for use upon automobiles, motorcycles, wagons, and kindred vehicles, and its objects are: first, to provide a wheel rim with which a constant and even resiliency may be obtained and held without the use of pneumatic tires; second, to provide a means whereby perfect resiliency may be obtained with a hard rubber tire, or even with a metal tire, and, third, to provide a means whereby my tires may be readily removed, repaired and replaced.

Figure 1:
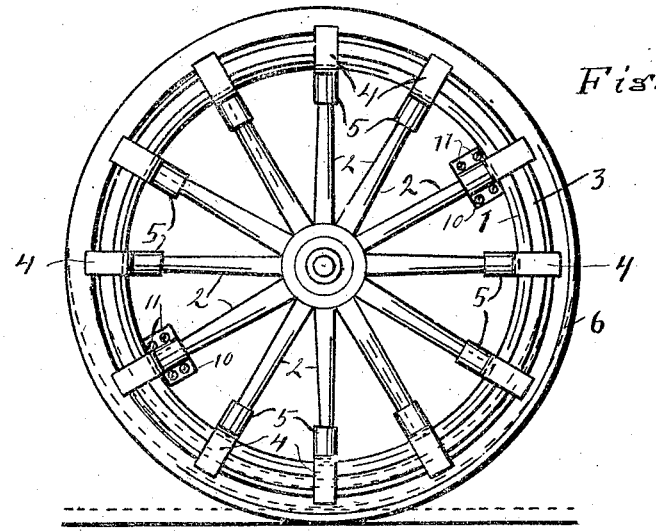
Figure 2:
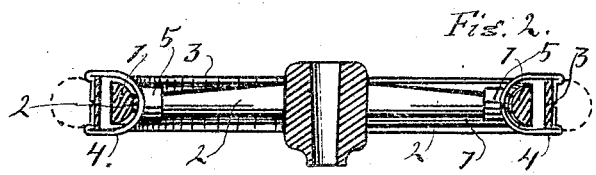
Figure 3:
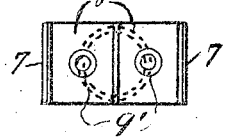
Figure 4:
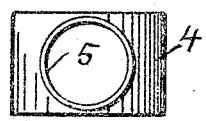

I attain these objects by the mechanism, construction and arrangement of parts shown in the accompanying drawing, in which Figure 1 is an elevation of a wheel with my appliance attached. Fig. 2 is a sectional view of the same horizontally through the diametrical center. Fig. 3 is an outside, or front plan of the adjustable clip with which I support the resilient tire. Fig. 4 is a plan of one of the clips showing the end of the socket, and Fig. 5 shows a modified form of the clip.

Similar numerals indicate similar parts throughout the several views.

My invention consists in placing a very resilient rim, as 3, outside of, and some little distance from the wheel rim 1, and I support this resilient rim by means of metal clips 4 which are provided with thimbles or sockets 5 that are intended to slide freely upon the ends of the spokes 2, so the rim 3 may be allowed to bend toward the wheel rim 1 when carrying a load, and thus impart sufficient resiliency to the rim 3 to meet all demands upon this class of vehicle wheels.

Figure 5:
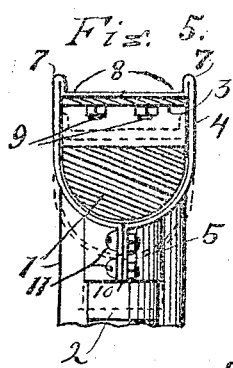

When making the clips 4 for new work, that is, when placing them upon wheels when they are being constructed, I prefer that the sockets be drawn from the metal so the clips may be made integral, as indicated at 4 in Fig. 1, and as shown in Fig. 4, but when making these clips for use upon old wheels I find it necessary to make the sockets in two parts and to use some available means, as the bolts 11 passed through the flanges 10 and bolting them firmly together, for securely connecting the two parts of the sockets together after they have been properly mounted upon the spokes, as indicated in the modified form shown in Fig. 5.

For securing these clips onto the rim 3 I form ledges 8 that are made to extend over, or under the rim, and are securely connected therewith, as with bolts 9 having counter sunk heads 9', or by any other available means.

It will be readily seen that when properly assembled the rim 3 will be held some distance from the rim 1, and concentric therewith, but if a load is placed upon the vehicle the weight will cause the rim 3 to be pressed toward the rim 1, as indicated by the dotted lines in Fig. 1, and in Fig. 5 and thus produce the required resiliency.

The projecting members 7 are designed to pass over the edges of the tire 6, as indicated in Fig. 1 to prevent the tire from sliding sidewise upon the rim 3.

In Fig. 5 I have shown the ledge 8 as extending entirely across the resilient rim 3 thus making this part of the construction integral. That is, the two sides of the clip are connected here, which renders it necessary to spread the lower ends of the sides, or the thimbles or sockets 5 to pass them over the wheel rim 1 and onto, or off of the spokes for applying, changing, repairing or removing the clips for any purpose whatever.

What I claim as new in the art, is:

1. In combination with the spokes and rim of a vehicle wheel, an auxiliary resilient rim mounted concentric with the wheel rim with an annular space between the two rims and fitted for mounting an ordinary stock tire thereon, clips mounted upon said resilient rim and slidingly mounted upon the spokes of the wheel.

2. In combination with the rim and spokes of a vehicle wheel, clips slidingly mounted upon the outer ends of the spokes, means whereby said clips may be readily applied to or taken off of the spokes, a resilient rim mounted upon said clips some distance from and concentric with the wheel rim, and fitted for mounting an ordinary stock tire thereon forming a resilient bearing and support for the wheel tire.

3. In combination with the rim and spokes of a vehicle wheel, clips having sockets thereon to slide upon the spokes, ledges on the bodies of the clips wherewith they may be securely connected with a suspended rim, a resilient rim mounted upon said clips concentric with, but some distance from the wheel rim, and fitted for mounting an ordinary stock tire thereon said clips so adjusted that weight upon the wheel will cause the wheel rim to be forced toward the part of the resilient rim that bears upon the ground and resiliency will, thereby, be imparted to the wheel.

Signed at Flint, Michigan, April 21, 1919.

LYMAN D. BROWN.